Sept. 29, 1953 G. W. HOPKINS 2,653,763

DIVIDEND ALIGNING MECHANISM

Filed Dec. 22, 1948 6 Sheets-Sheet 1

INVENTOR.

INVENTOR.

Sept. 29, 1953 G. W. HOPKINS 2,653,763

DIVIDEND ALIGNING MECHANISM

Filed Dec. 22, 1948 6 Sheets-Sheet 3

INVENTOR.

INVENTOR.

*INVENTOR.*

DIVIDEND ALIGNING MECHANISM

Filed Dec. 22, 1948 6 Sheets-Sheet 6

INVENTOR.

Patented Sept. 29, 1953 2,653,763

UNITED STATES PATENT OFFICE 2,653,763

DIVIDEND ALIGNING MECHANISM

George W. Hopkins, San Leandro, Calif., assignor to Friden Calculating Machine Co., Inc., a corporation of California Application December 22, 1948, Serial No. 66,777

12 Claims. (Cl. 235—63)

This invention relates to a division mechanism for calculating machines and more particularly to means for automatically aligning the dividend and divisor prior to the outset of a division operation.

In performing division operations on calculating machines of the type having relatively shiftable dividend and divisor receiving devices, it has been necessary in the past for the operator of the machine to enter each of the factors in the machine and then to manually control the shift of the receiving devices relative to one another until the highest significant digits of the factors have been brought into alignment. The division mechanism is then set into operation by manipulation of a suitable control key or lever and the machine proceeds to divide the dividend by the divisor in a fully automatic manner without requiring any further attention on the part of the operator.

The present invention deals with a mechanism for rendering the automatic division mechanism of a calculating machine more completely automatic by causing the dividend and divisor to be properly aligned prior to the outset of the division operation proper. According to the present invention, after the operator has set the dividend and divisor into the machine, the division key is depressed and the novel mechanism to be hereinafter disclosed causes the two factor receiving devices to be shifted relative to one another until the highest order digits are brought into proper alignment for division after which the machine proceeds to automatically divide the dividend by the divisor and to indicate the result on a set of numeral wheels.

Hence, it is an object of the present invention to provide an improved automatic division mechanism.

Another object of the invention is to provide a mechanism for automatically aligning the dividend and divisor prior to the outset of the actual dividing operation.

A further object of the invention is to provide a dividend and divisor aligning mechanism which utilizes the existing automatic division mechanism for effecting the alignment of the factors, the aligner mechanism merely serving to control the automatic division mechanism in such a manner as to cause the two factors to be properly aligned before the actual division operation takes place.

Still a further object of the invention is to provide a mechanism for aligning the dividend and divisor by causing continuous and repeated operation of the program control mechanism of the machine with right-hand shifting of the carriage until a tens transfer occurs in one of the higher orders of the dividend register. This condition then causes the continuous and repeated operation of the program control mechanism to be discontinued and conditions the machine for left-hand shifting of the carriage so as to cause a normal dividing operation to take place.

With these and other objects in view which will become apparent from the following description, the invention includes various novel combinations of parts and features of design which are incorporated in the preferred embodiment of the invention hereinafter to be described with reference to the accompanying drawings in which:

Fig. 6 is a plan view showing the lateral arrangement of certain of the parts involved in the novel division aligner mechanism.

The machine to be hereinafter shown and described is basically the same as the calculating machine shown in U. S. Patent No. 2,229,889, issued to Carl M. F. Friden, on January 28, 1941, and hence, only so much of the mechanism shown and described in the aforesaid patent will be set forth herein as is necessary in order to provide a complete understanding of the manner in which the present mechanism is related to that shown in the patent. Similarly, the automatic division mechanism herein employed is essentially like that illustrated in U. S. Patent No. 2,327,981, issued to Carl M. F. Friden, on August 31, 1943, and therefore only those parts of the automatic division mechanism which are directly concerned with the present invention will be disclosed in this application.

*Selecting and actuating mechanisms*

Figure 1:
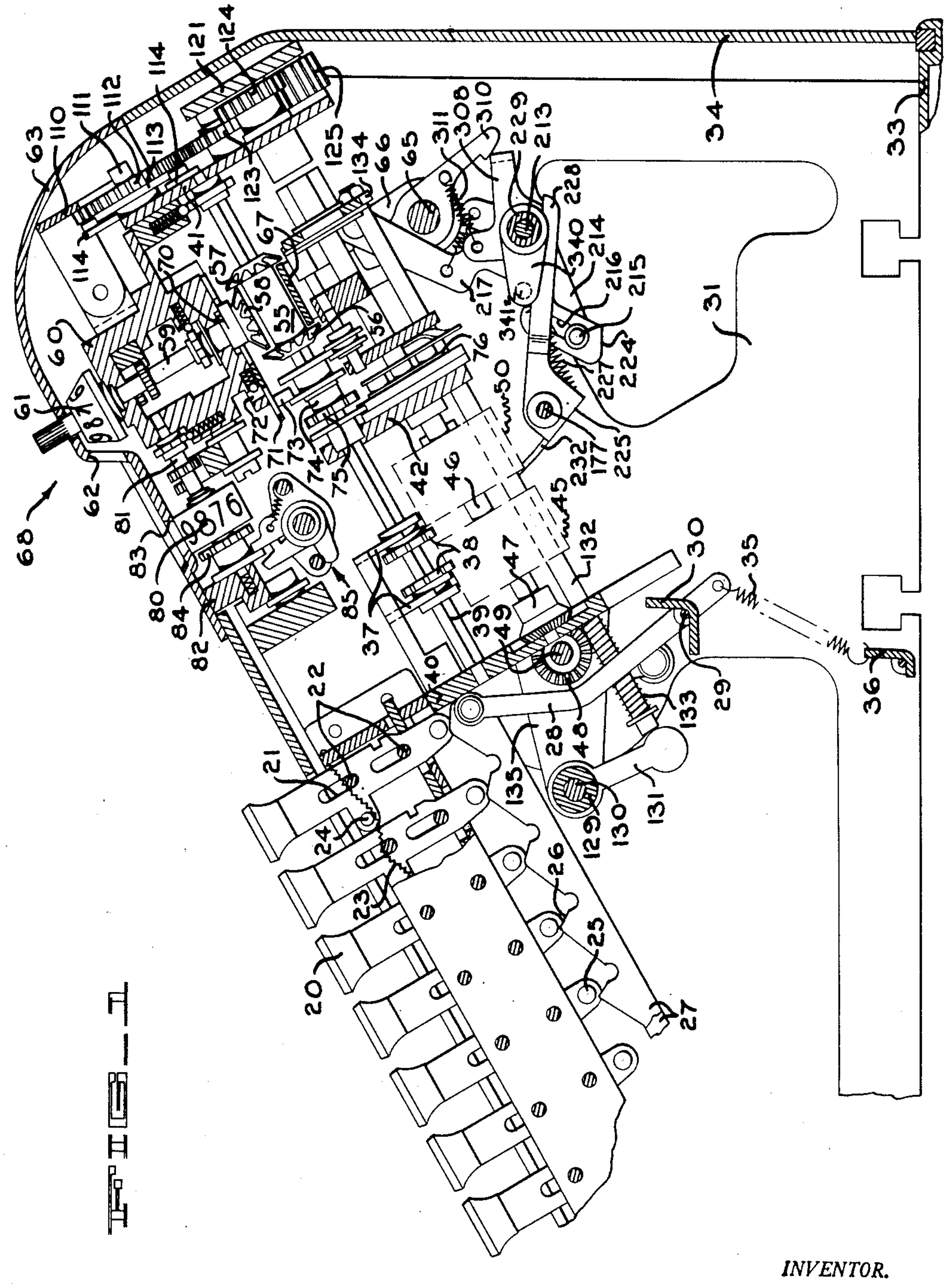
Fig. 1 is a longitudinal sectional elevation showing the basic mechanism of the machine.

As shown in Fig. 1 of the drawings the calculating machine is provided with a plurality of rows or banks of amount keys 20 which are mounted for vertical sliding movement by means of elongated slots 21 in the key stems which cooperate with through-rods 22 which are supported within the keyboard framework. The keys 20 in each bank are resiliently urged into their raised or undepressed positions by means of a longitudinally extending spring 23 which is threaded over the upper through-rods 22 and under studs 24 provided on the stems of the keys 20. The lower ends of the key stems carry studs 25 which are adapted to cooperate with inclined cam faces 26 provided on selector bars 27. There are two such bars associated with each bank of keys and each of the bars is supported for horizontal reciprocating movement by means of a pair of parallel links 28 (only one shown in Fig. 1) pivotally connected at their upper ends to the selector bars 27 and pivotally supported at their lower ends on rods 29 (only one shown) supported by angle bars 30 extending between a left side frame 31 and a right side frame 32 (Fig. 6) of the machine. The side frames 31 and 32 are suitably secured to a base 33 which also serves as a support for the covers 34 of the machine.

Each of the selector bars 27 is urged toward the rear of the machine by means of a spring 35 tensioned between the lower end of each of the rear supporting links 28 and an angle-bar 36 extending between the side frames of the machine. At their rear ends, the selector bars of each pair are provided with bent-over, forked extensions 37 which engage with grooves provided in the hubs of a pair of selector gears 38 which are slidably and non-rotatably mounted on a square shaft 39 which is journalled between cross-bars 40 and 41 extending between the side frames 31 and 32 and is also supported intermediate its ends by a bearing provided in an intermediate cross-bar 42.

The selector gears 38 are arranged to cooperate with a drum type actuator 45 secured to an actuator shaft 46 which is journalled between the cross-bars 40 and 42 and has secured to its forward end a bevel gear 47 which meshes with a bevel gear 48 secured to a transverse drive shaft 49. Secured to the actuator shaft 46 immediately behind the drum 45 is a second actuator drum 50 which is adapted to cooperate with a pair of selector gears controlled by an adjacent bank of amount keys 20.

As fully shown and described in the aforementioned Patent 2,229,889, the drums 45 and 50 are provided with a series of staggered actuator teeth which serve to rotate the selector gears 38 by differential amounts when the gears are slid forwardly on the shaft 39 into cooperative relationship with the teeth. As fully described in the patent, the 1–5 keys 20 control the forward selector gear 38 while the 6–9 keys control the rear gear 38. When one of the 1–5 keys or one of the 6–9 keys is depressed, its associated selector bar 27 is moved forwardly by a differential amount through the cooperation of the stud 25 with the inclined camming surface 26 so as to cause its associated selector gear 38 to be differentially positioned with respect to the actuator drum 45. The actuator teeth on the drum 45 will thereby rotate the selector gear 38 and the square shaft 39 to an extent depending upon the value of the key depressed.

Slidably and non-rotatably mounted on the rear end of each of the square shafts 39 is a sleeve 55 to which is secured an add gear 56 and a subtract gear 57, these gears being arranged to cooperate with a gear 58 secured to the lower end of a dial shaft 59 journalled in a hollow frame bar 60 of a shiftable numeral wheel carriage 68. Secured to the upper end of each of the dial shafts 59 is a numeral wheel 61 bearing the numerals from "0" to "9" which may be viewed through a window 62 provided in the casing 63 of the carriage.

The add and subtract gears 56 and 57 are normally maintained in a neutral position where they lie out of engagement with the gears 58, by a spring actuated centralizer 64 (Fig. 3) which yieldingly tends to maintain a gate shaft 65 (see also Fig. 1) in a neutral position. The shaft 65 is journalled at either end in the side frames 31 and 32 and has secured thereto a pair of spaced arms 66 (only one shown) which support a strap or gate 67 lying within the space existing between the add-subtract gears 56 and 57. When the gears 56 and 57 are located in their neutral position by means of the centralizer 64, the numeral wheel carriage 68 may be shifted laterally across the machine without interference from the gears 56 and 57. However, by means of a mechanism hereinafter to be described, the gate 67 may be moved rearwardly so as to engage the gears 56 with the gears 58 and, upon rotation of the actuator shafts 46, cause the accumulator wheels 61 to be rotated in a forward or positive direction. Similarly, in subtract operations, the gate 67 is moved forwardly so as to cause the subtract gears 57 to mesh with the dial shaft gears 58 and thereby cause the accumulator wheels 61 to be rotated in a reverse, or negative, direction upon rotation of the actuator shafts 46.

*Tens-transfer mechanism*

Secured to the lower end of each of the dial shafts 59 just above the gear 58 is a transfer cam 70 which is adapted to cooperate with a transfer lever 71 bearing a stud 72 which is journalled in the carriage frame bar 60. Mounted on the outer end of the transfer lever 71 is a pin 73 which lies between a pair of flanges provided on the hub 74 of a tens-transfer gear 75 located in the next higher order of the machine. The hub 74 and gear 75 are slidably and non-rotatably mounted on the square shaft 39 whereby rotation of the gear 75 will be transmitted through the add-subtract gears 56, 57 to the dial shaft 59. When the accumulator wheel 61 passes from "0" to "9" or from "9" to "0" a nose on the transfer cam 70 will rock the transfer lever 71 and move the pin 73 forwardly so as to move the transfer gear 75 into the path of a single transfer tooth provided on a tens-transfer actuator 76 secured to the actuator shaft 46. Inasmuch as the pin 73 controls the transfer gear 75 in the next higher denominational order of the machine, the accumulator dial 61 in the next higher order will be advanced one step by the tens-transfer actuator 76 for this order thereby effecting the carry from one order to the next higher order as required.

*Revolutions counter*

Also provided in the numeral wheel carriage is a series of revolutions counter wheels 80 each of which is secured to a longitudinally extending shaft 81 journalled at its forward end in a carriage frame bar 82 and at its rearward end in the hollow cross-bar 60. Each of the wheels 80 is provided with a series of numerals from "0" to "9" which may be viewed through a window 83 provided in the casing 63 of the carriage. Secured to each of the shafts 81 adjacent to the wheels 80 is an actuator gear 84 which is arranged to cooperate with a revolutions counter actuator mechanism 85 so that with the numeral wheel carriage in its extreme left-hand position the right-most revolutions counter wheel 80 will be advanced one step for each rotation of the actuator shafts 46. This mechanism is fully shown and described in the above-mentioned Patent No. 2,229,889 to which reference may be had for a full and complete disclosure of this part of the machine.

*Plus and minus keys*

In order to control the engagement of the add gears 56 with the gears 58 in the lower ends of the dial shafts or, alternatively, the engagement of the subtract gears 57 therewith, the machine is provided with a plus key 90 (Fig. 2) and a minus key 91, both of which are slidably mounted on a control plate 92 spaced from and secured to the right side frame 32 by suitable screws and spacing sleeves. The plus and minus keys are provided with roller studs 93 and 94, respectively, which cooperate with inclined cam faces 95 and 96, respectively, provided on a gate setting slide 97. Slide 97 is pivotally connected at either end to the upper ends of arms 98 and 101 (Fig. 3), the arm 98 being pivoted at 99 to the control plate 92 while the arm 101 is secured to the gate shaft 65. Hence, when the plus key 90 is depressed, the gate setting slide 97 will be moved rearwardly so as to rotate the shaft 65 in a clockwise direction thereby moving the gate 67 (Fig. 1) toward the rear of the machine so as to cause the add gears to be engaged with the dial shaft gears 58. In a similar manner, depression of the minus key 91, will, through the cooperation of the stud 94 and the inclined surface 96, cause the gate setting slide 97 to be moved forwardly thereby rotating the gate shaft 65 counter-clockwise so as to cause the subtract gears 57 to be engaged with the dial shaft gears 58.

For the purpose of initiating the cycling mechanism of the machine when either of the keys 90 or 91 is depressed, each of these keys is provided with a half-round stud 102 which is adapted to cooperate with an inclined camming surface 103 provided on a cycle initiating slide 104. The rear end of this slide bears against a pin 105 which, when moved rearwardly, will cause the electric driving motor of the machine to be energized and the main clutch thereof to be engaged. This mechanism is shown and described in the aforementioned Patent No. 2,327,981 to which reference may be had for a more complete disclosure.

*Carriage shift mechanism*

Means are provided for shifting the carriage in either direction from one ordinal position to another by power driven means controlled by manually operable shift keys. The power driven means is actuated by the two right-hand actuator shafts 46 in a manner which will be described more in detail hereinafter.

As shown in Fig. 1, the numeral wheel carriage 68 has supported thereon a notched plate 110, the notches in which are arranged to be engaged by a pair of shift pins 111 secured to the rear face of a carriage shift gear 112 journalled in the frame cross-bar 41. For each one-half revolution of the gear 112, the carriage will be shifted one ordinal position so as to cause the dial shaft gears 58 to lie in cooperative relationship with the next adjacent set of add-subtract gears 56 and 57. In order to provide for accurate centering of the carriage at the end of a shift operation, a centralizing cam 113 is secured to the forward face of the shift gear 112. Cooperating with the cam 113 are a pair of centralizing arms 114 (Figs. 1 and 6) which are pivoted at one end to cross-bar 41 and provided on their opposite ends with rollers which engage with opposite sides of the cam 113 under the influence of a spring (not shown) tensioned between the arms 114. When the pins 111 are in horizontal alignment as shown in Figs. 1 and 6, the carriage is properly located in one of its ordinal positions and the centralizing rollers are seated in opposite depressions formed between the high portions of the cam 113.

The shift gear 112 is rotatable in either direction by selectively operable drive connections with the two right-most actuating shafts 46 of the machine. For this purpose these two shafts are extended rearwardly (Figs. 1 and 6) where each is provided with a collar 115 secured to the rear end thereof. Each of the collars 115 is provided with a pair of diametrically opposite slots slidably engaged by a corresponding pair of teeth 116 formed on a shiftable coupling member 117 which is freely mounted on the ends of each of the shafts 46. Each member 117 is provided with a pair of oppositely disposed clutch teeth 118 which are designed to engage with corresponding slots provided in gear sleeves 119 and 120 rotatably journalled between the cross-bar 41 and a frame plate 121 secured in spaced relationship to the bar 41. Gear sleeve 119 has mounted thereon a gear 122 meshing with an idler gear 123 (see Fig. 1) journalled between the bar 41 and the plate 121 and meshing with the shift gear 112. Gear sleeve 120 has mounted thereon a gear 124 which lies out of the plane of the idler gear 123 and meshes with a wide reverse idler gear 125 suitably journalled between the bar 41 and plate 121. The idler gear 125 meshes with the idler gear 123 so that rotation of gear sleeve 119 in a clockwise direction, as viewed from the rear of the machine, will cause clockwise rotation of shift gear 112 and thereby cause shifting of the numeral wheel carriage to the left as viewed from the front of the machine. Correspondingly, rotation of the gear sleeve 120 in a clockwise direction, as viewed from the rear, effects counter-clockwise rotation of the shift gear 112 and causes the numeral wheel carriage to be shifted to the right, as viewed from the front of the machine. Thus, by selectively establishing one or the other of the drive connections between the gear sleeves 119 and 120 and the collars 115, the carriage may be shifted in either direction. The connection between the collars and gear sleeves may be selectively effected by shifting the members 117 rearwardly so as to establish a drive from the actuator shafts 46 to the carriage shift gear 112. The gear ratios are so chosen that one rotation of the actuating shafts 46 effects a 180 degree rotation of the shift gear 112 and so causes the carriage to be shifted one ordinal space to the right or left.

As fully disclosed in U. S. Patent No. 2,327,635, issued to Carl M. Friden on August 24, 1943, a pair of manually operable shift keys are provided for controlling the operation of the coupling members 117. If the operator wishes to shift the carriage toward the right, this result may be effected by depressing the right shift key which causes a sleeve 129 (Fig. 1) rotatably mounted on a shaft 130 journalled between the right side frame 32 and a bracket 135 to be rocked counter-clockwise. This causes an arm 131 secured to the left end of the sleeve to engage with the forward end of a rearwardly extending rod 132 mounted for sliding movement in cross-bars 40 and 42. The rod 132 is resiliently urged toward the front of the machine by means of a spring 133 compressed between cross-bar 40 and a suitable washer mounted on the forward end of the rod 132. At its rear end the rod is provided with a shift fork 134, the forked end of which engages with an annular groove provided in the right-hand coupling member 117. Thus, when the sleeve 129 is rocked counter-clockwise, the arm 131 will force the rod 132 rearwardly against the force of the spring 133 and thereby move the teeth 118 on the coupling member 117 into engagement with corresponding notches provided in the gear sleeve 120. The rearward movement of the member 117 is insufficient to cause the teeth 116 to become disengaged from the slots provided in the collar 115 so that a positive driving connection is established between the actuator shaft 46 and the gear sleeve 120. As fully disclosed in the aforementioned Patent No. 2,327,635, depression of either of the shift keys causes the electric driving motor to be energized and the clutch to be engaged so that the actuator shafts 46 are rotated thereby causing shifting movement of the carriage in a right-hand direction.

In a similar manner, depression of the left shift key will cause the shaft 130 to be rocked counter-clockwise, as viewed in Fig. 1, thereby causing an arm secured to the shaft, similar to the arm 131, to move a rod 136 (Fig. 6), similar to the rod 132, rearwardly in the machine thereby causing its associated shift fork 137 to move the left-hand coupling member 117 rearwardly so that the teeth 118 thereof will engage with slots provided in the gear sleeve 119.

*Automatic division mechanism*

As mentioned earlier herein, the machine shown in the accompanying drawings is provided with a mechanism for enabling a dividend set up on the accumulator wheels 61 to be automatically divided by the method of successive subtraction by a divisor set up on the amount keys 20. As was mentioned above, the mechanism provided in the present machine for accomplishing this purpose is similar to that shown in U. S. Patent No. 2,327,981 and, accordingly, only the principal portions of the automatic division mechanism will be described herein.

The automatic division mechanism operates to control the functioning of the machine so as to cause the divisor to be repeatedly subtracted from the dividend until an overdraft occurs in the accumulator, whereupon the overdraft is corrected and the carriage shifted one ordinal space to the left where the process is repeated. The number of subtraction cycles effected in each order is registered in the revolutions counter as the quotient. The division operation is controlled by a program control mechanism which becomes effective each time an overdraft occurs in the accumulator to program the operation of the add-subtract mechanism and the carriage shift mechanism so as to cause a predetermined sequence of operation thereof during uninterrupted cyclic operation of the actuating mechanism of the machine. The division operation is initiated by the depression of a division key which causes the program control mechanism to be operatively connected with the add-subtract gate and the carriage shift mechanism and renders the overdraft control mechanism effective to control the operation of the program control mechanism.

Figure 2:
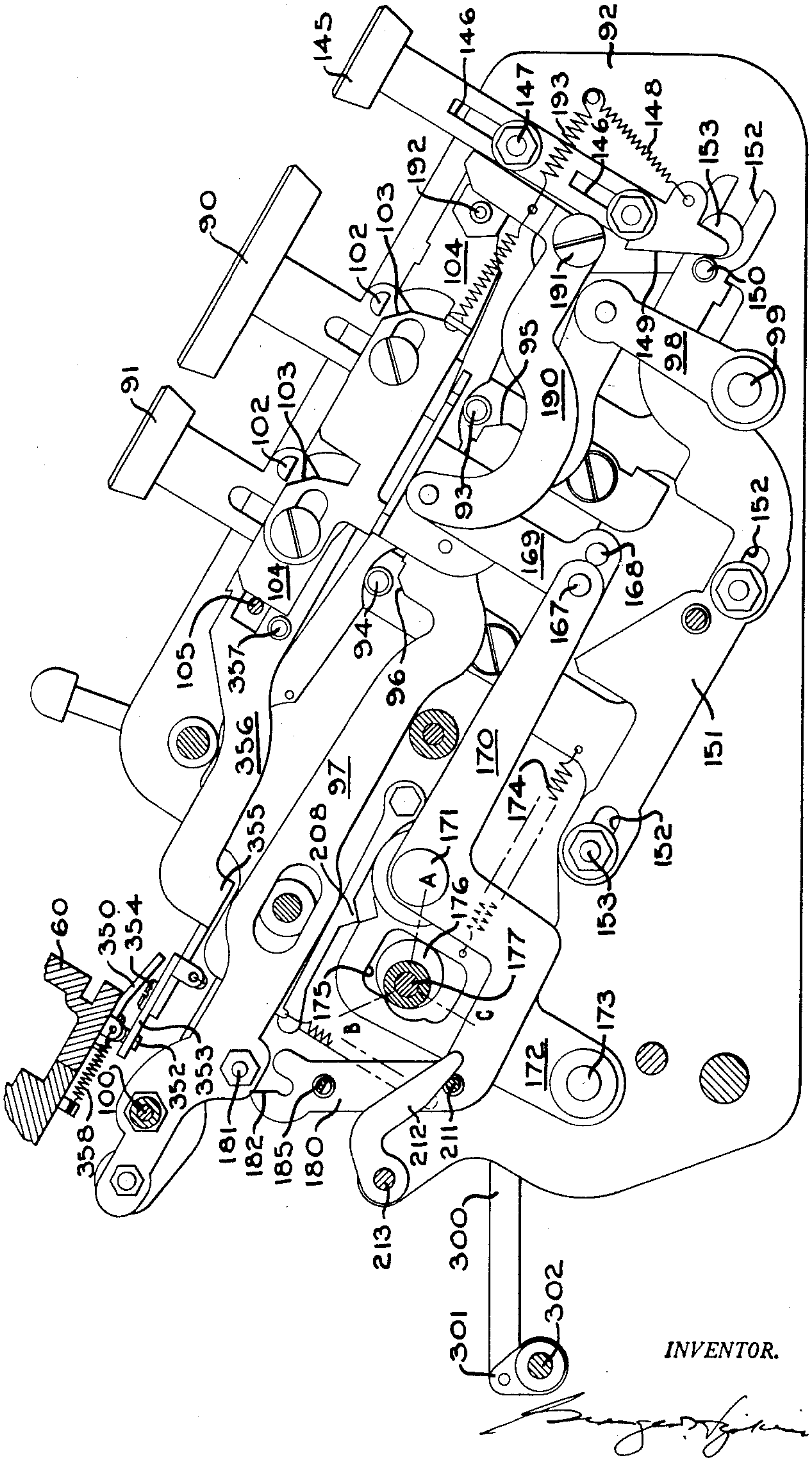
Fig. 2 is a view showing those parts of the division control mechanism which are mounted on the left-hand side of the control plate.
Figure 3:
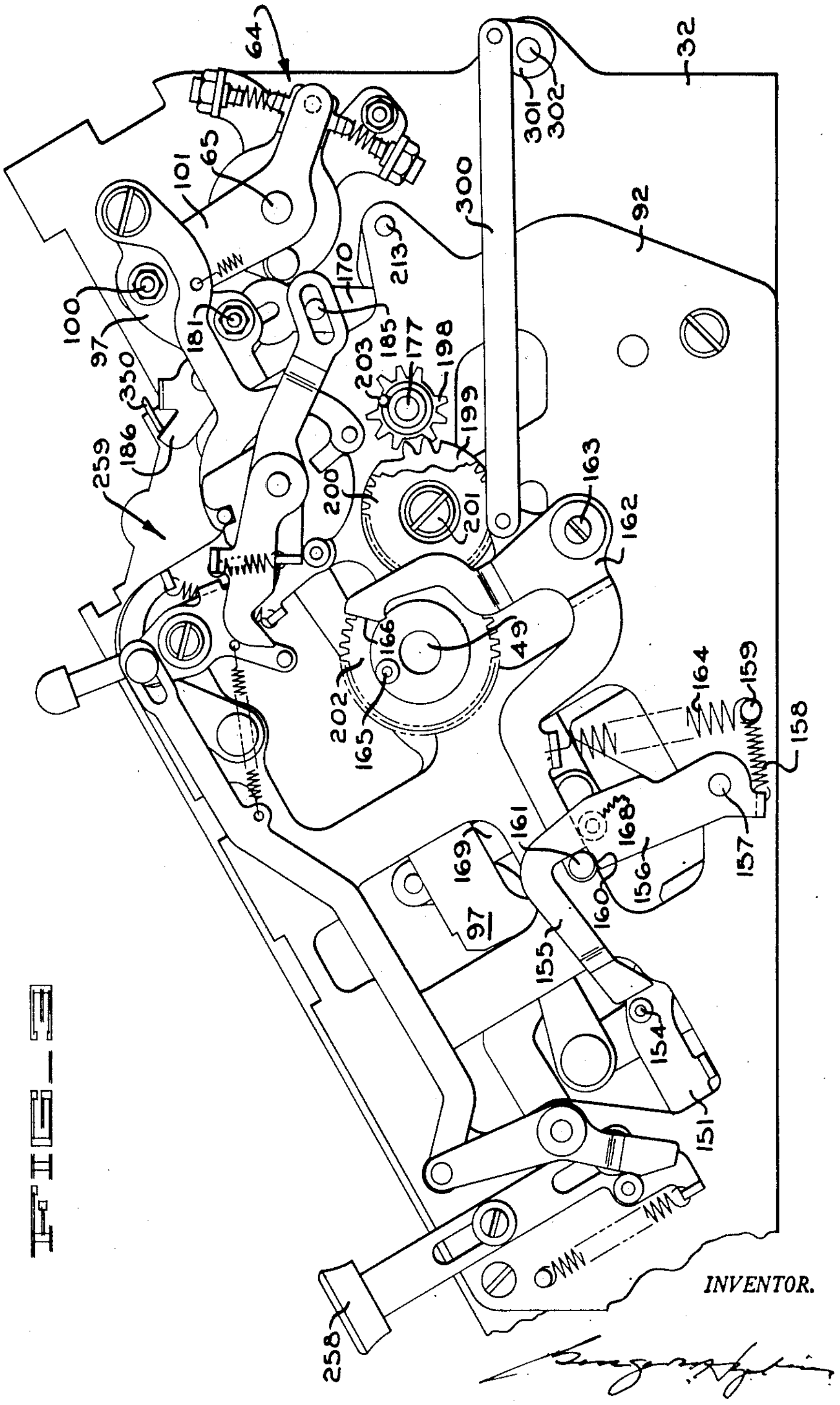
Fig. 3 is a view showing those parts of the division control mechanism which are mounted on the right-hand side of the control plate.

As shown in Fig. 2, a division key 145 is slidably mounted on the control plate 92 by means of elongated slots 146 provided in the key stem which cooperate with suitable guide studs 147 mounted in the control plate so as to guide the key for vertical reciprocatory movement. The key is normally urged to its raised position by means of a suitable spring 148 and is provided with an inclined cam face 149 which bears against a roller stud 150 mounted on a division control slide 151. This slide is supported for endwise sliding movement on control plate 92 by means of elongated slots 152 which cooperate with studs 153 secured to the control plate. As shown in Fig. 3, the slide 151 is provided with a roller stud 154 which lies in front of a finger 155 formed on the upper end of a latch 156 pivotally mounted on the control plate 92 at 157. The finger 155 is urged toward the front of the machine by means of a spring 158 tensioned between the lower end of the latch 156 and a stud 159 mounted in the control plate so as to normally maintain a shoulder 160 on the latch 156 beneath a stud 161 mounted on the forward end of a division setting actuator 162 which is pivotally mounted on a screw 163 fastened to the control plate 92. The actuator 162 is urged to rotate in a counter-clockwise direction by means of a strong spring 164 tensioned between the actuator and the stud 159 so as to urge the stud 161 into engagement with the shoulder 160. However, upon depression of the division key 145, the cam face 149 will engage with the roller stud 150 thereby moving the slide 151 rearwardly with the result that the roller stud 154 thereon will rock the latch 156 clockwise so as to remove the shoulder 160 from beneath the stud 161 and allow the actuator 162 to be rocked counter-clockwise by the strong spring 164. The actuator will be restored during cycling of the machine by means of a roller 165 secured to the face of a gear 202 fast on the shaft 49. The roller 165 is adapted to engage an inclined cam face 166 formed on an upwardly extending arm of the actuator thereby rocking the actuator clockwise against the urgency of the spring 164 and permitting the latch 156 to reengage with the stud 161.

Lying beneath the forward end of the actuator 162 is a roller 168 (see also Fig. 2) mounted in the lower end of a link 169 which is pivotally connected at 167 to the forward end of a connecting lever 170. This lever is pivoted at 171 to a follower arm 172 pivoted to the control plate at 173 and urged in a clockwise direction, as viewed in Fig. 2, by means of a spring 174. The arm 172 is provided with an aperture 175 within which is located an eccentric cam 176 secured to a program controlling shaft 177. As described in the aforementioned Patent No. 2,327,981, this shaft forms a part of the program control mechanism and is rotated during division operations to control the setting of the add-subtract gate and the operation of the left shift clutch. These operations are performed in a predetermined sequence so as to cause the machine to carry out a division operation in a fully automatic manner.

The lever 170 is provided at its rearward end with an upwardly directed arm 180 which is bifurcated at its upper terminus for the purpose of engaging with a stud 181 secured to the gate setting slide 97. Thus, when the division key 145 is depressed so as to release the actuator 162 (Fig. 3) for operation under the influence of its spring 164, the roller 168 will be carried downwardly, thereby causing the lever 170 (Fig. 2) to be rocked clockwise about its pivot 171 so as to engage the bifurcation with the stud 181. When the control shaft 177 is in its normal or home position as shown in Fig. 2, the cam 176 thereon will cause the arm 172 to be maintained in its forward position, as shown in Fig. 2, so that when the lever 170 is rocked clockwise, upon depression of the division key, an inclined cam face 182 provided on the rear lip of the bifurcation will engage with the stud 181 and force the gate setting slide 97 into its forward position so as to engage the subtract gears 57 with the dial shaft gears 58.

Mounted in the arm 180 is a half-round stud 185 which is adapted to be engaged by a spring-pressed latch 186 (Fig. 3) so as to retain the lever 170 is in its operated position throughout the division operation.

Pivotally connected to the upper end of the link 169 is the rearwardly directed arm of a bellcrank lever 190, which lever is pivotally mounted on a screw 191 secured to the control plate 92. The lever 190 has an upwardly extending arm which lies in front of a pin 192 mounted in the cycle initiating slide 104. The bellcrank lever 190 is urged to rotate in a clockwise direction about the screw 191 by means of a spring 193 so as to normally maintain the link 169 in its raised position with the roller 168 engaged with the underside of the actuator 162 (Fig. 3) and also to maintain the lever 170 in the position shown in Fig. 2. However, when the division key is depressed, the link 169 will be forced downwardly by the strong spring 164 thereby rocking the bellcrank lever 190 counterclockwise and forcing the slide 104 rearwardly so as to operate the stud 105 and thereby cause energization of the electric driving motor and engagement of the main clutch of the machine.

Referring now to Fig. 3 of the drawings, it will be observed that the program control shaft 177 extends through the control plate 92 and is provided on its righthand end with a mutilated gear 198 which is located in meshable relationship with a larger mutilated gear 199 which is secured to a conventional gear 200 rotatably journalled on a screw 201 mounted in the control plate 92. The gear 200 meshes with the gear 202 secured to the transverse drive shaft 49 so that when the main clutch is engaged and the shaft 49 rotated, the gear 202 will drive the gear 200 and the large mutilated gear 199. The small mutilated gear 198 is normally located in an inoperative position in which it lies out of the plane of the mutilated gear 199, such inoperative position being determined by a notch provided in the gear 198 engaging over a pin 203 on the control plate 92. The shaft 177 and the gear 198 are normally urged to the left as viewed from the front of the machine by means of a compression spring (not shown) mounted on the left-hand end of the shaft 177 so as to urge the notch in the gear 198 to engage over the pin 203 in which position the gear lies out of the path of the large mutilated gear 199. As seen in Fig. 3, gear 198 has three equally spaced sets of three teeth each for cooperation with a single set of two teeth provided on the gear 199. As the gear 199 rotates counter-clockwise during cycling of the machine, its two teeth are so positioned thereon as to engage one of the sets of three teeth on the gear 198 immediately before the end of a machine cycle. Hence, when the gear 198 is projected into the path of the gear 199 during a cycle of operation of the machine, the gear 198 will be rotated clockwise through one-third of a revolution at the end of that cycle and also through one-third of a revolution at the end of each of the two next succeeding cycles, the gear being maintained in its projected position by the engagement of the pin 203 with the inner face of the gear 198.

Figures 4, 5:
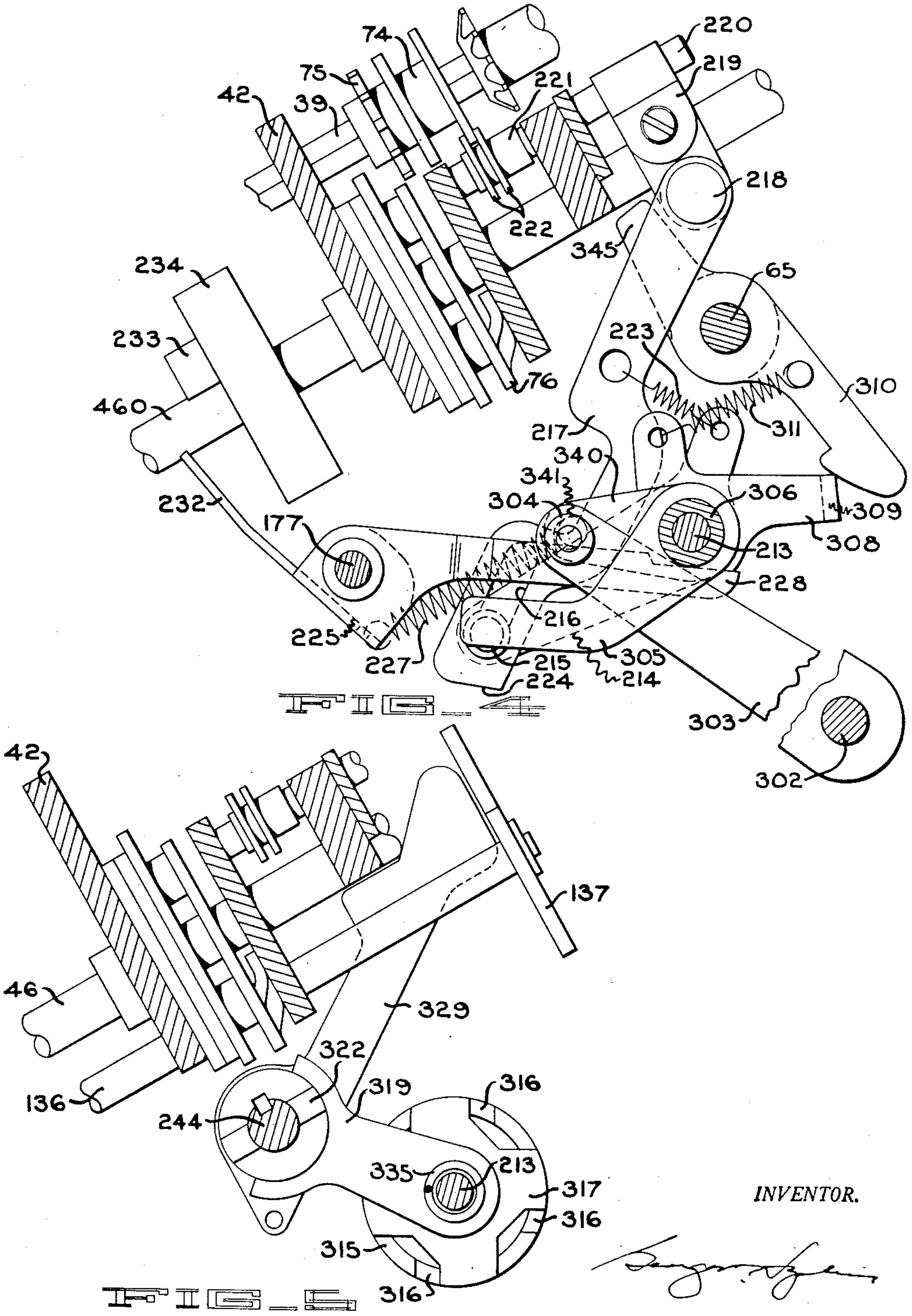
Fig. 4 is a longitudinal sectional elevation of the overdraft control mechanism located on the left-hand side of the machine, this section being taken along the line 4—4 in Fig. 6.
Fig. 5 is a longitudinal sectional elevation showing details of the carriage shift reversing mechanism, this section being taken along the line 5—5 in Fig. 6.
Figure 3:
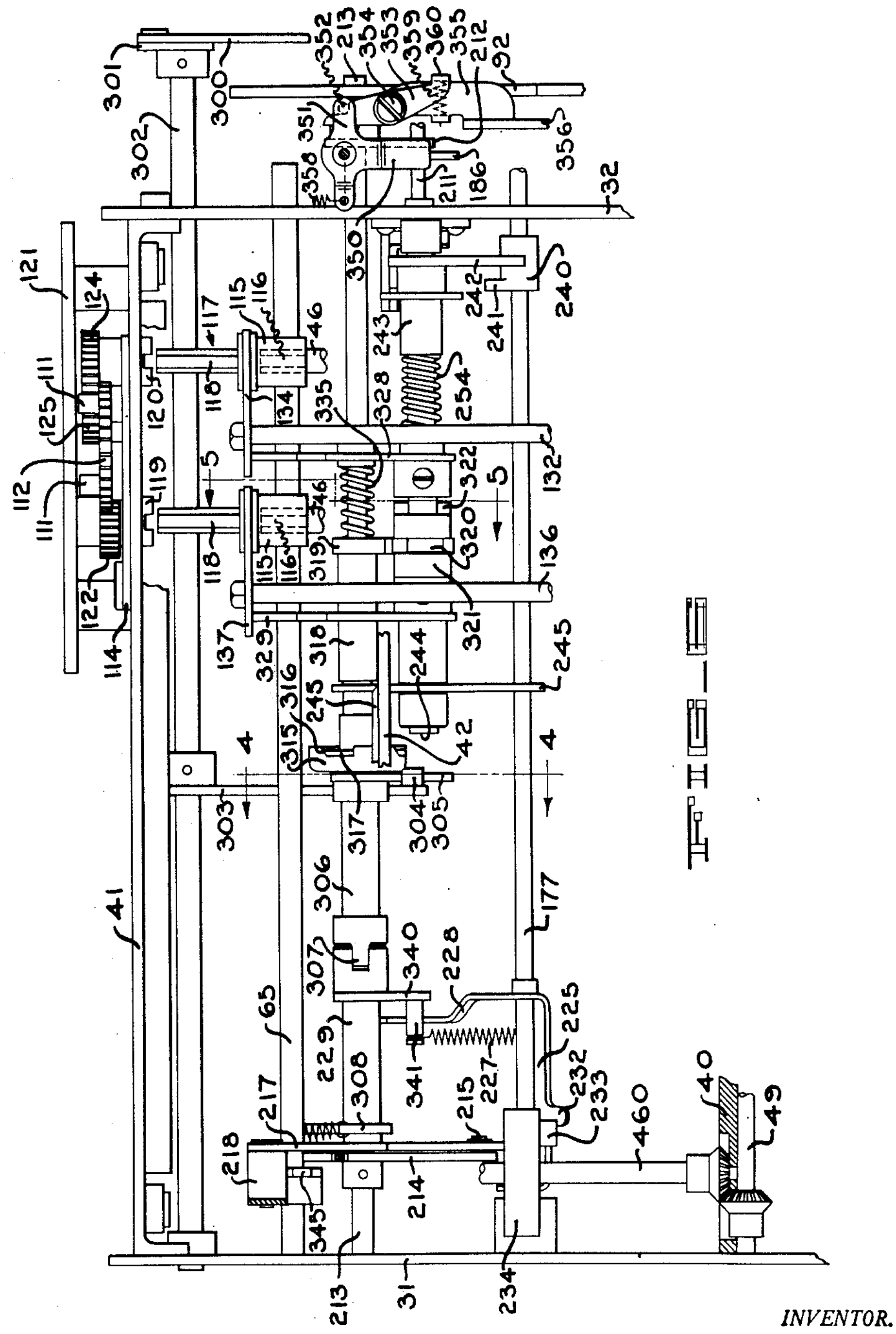

Mounted on the lever 170 (Fig. 2) is a stud 211 which lies beneath the forward end of an arm 212 secured to a laterally extending shaft 213 which is journalled in the control plate 92 and the left side frame 31 of the machine. Secured to the shaft 213 near the left-hand side of the machine is an arm 214 (Figs. 1 and 4) which bears a stud 215 engaging in an elongated slot 216 provided in the lower end of an overdraft control link 217. This link is pivoted at its upper end on a stud 218 secured to a yoke 219 which is secured to an extension 220 provided on the highest order tens-transfer detent pin 221. As shown in Fig. 4, the pin 221 is provided with a pair of flanges 222 which engage with either side of one of the flanges provided on the hub 74 of the highest order tens-transfer gear 75 which is located on the leftmost square shaft 38 of the machine. As earlier mentioned herein, when a transfer is to be effected from a lower to a higher order, the transfer gear 75 is moved forwardly into the path of the single tooth provided on the tens-transfer actuator disc 76. Hence, when a transfer is effected which involves the shifting of the highest order transfer gear 75, the pin 221 will be moved forwardly thereby causing similar movement of the yoke 219 and the overdraft control link 217 pivoted thereto. As shown in Fig. 4, the forward end of the link is normally held in its lower or inactive position by a spring 223 but, upon depression of the division key and rocking of the lever 170, the shaft 213 will be rocked clockwise, as viewed in Fig. 4, thereby lifting the forward end of the link 217 so as to place an abutment face 224 formed thereon immediately behind a bail 225 which is pivotally but non-slidably mounted on the program control shaft 177. The bail is normally held in a counter-clockwise position by means of a spring 227 secured thereto so as to maintain the rear end of an arm 228 formed thereon in contact with the under side of a sleeve 229 (Fig. 6) rotatably mounted on the shaft 213. When the forward end of the link 217 has been moved up behind the bail 225 upon the setting of the division mechanism and a tens-transfer takes place which causes the highest order transfer gear 75 to be moved forward, the abutment face 224 will contact the bail 225 and cause it to be rocked clockwise about the shaft 177 against the urgency of the spring 227 so as to move a flag 232 formed on the bail into the path of travel of a pin 233 secured to a drum 234 on a shaft 460 which corresponds to the actuator shafts 46 with the exception that the actuators 45 and 50 are omitted. Hence, as the shaft 460 rotates counterclockwise, as viewed from the front of the machine, the pin 233 will contact the flag 232 near the end of the machine cycle and force the shaft 177 to the right to thereby move the mutilated gear 198 into the path of its associated gear 199. Thus the shaft 177 and the cam 176 (Fig. 2) will be given three steps of movement during the next three cycles of the machine after which the gear 198 will drop back over the pin 203 to its inactive position. The overdraft control link 217 will, meanwhile, be moved toward the rear of the machine so as to release the flag 226 as a result of the restoration of the detent pin 221 by the conventional tens-transfer restoring mechanism.

When the cam 176 occupies the position marked A in Fig. 2, which is the position of the cam when the notch in the small mutilated gear 198 engages with the pin 203, clockwise movement of the lever 170 (Fig. 2) will cause the gate setting slide 97 to be moved forwardly and thereby engage the subtract gears 57 with the dial shaft gears 58. At the end of the subtract cycle in which an overdraft occurs, the shaft 177 will be rotated counterclockwise (Fig. 2) through 120 degrees to the position marked B. The rotation of the shaft and cam 176, in cooperation with the aperture 175, will cause the arm 172 to be rocked counter-clockwise, thereby moving the lever 170 toward the rear of the machine so as to cause the add-subtract gate to be moved to its add position. During the next cycle of the machine, the divisor set on the amount keys 20 will be added back into the accumulator so as to correct the overdraft and at the end of this cycle the shaft 177 will be rotated through another 120 degrees to the position marked C and thereby move the arm 172 to an intermediate position where the add-subtract gears 56 and 57 will be held out of engagement with the dial shaft gears 58 preparatory to a carriage shifting operation. The arm 172 will be yieldably maintained in this intermediate position by means of a spring-urged centralizer arm 208 which is provided with a V-shaped nose which is adapted to engage in a corresponding notch provided in the upper edge of the arm 172.

Figure 7:
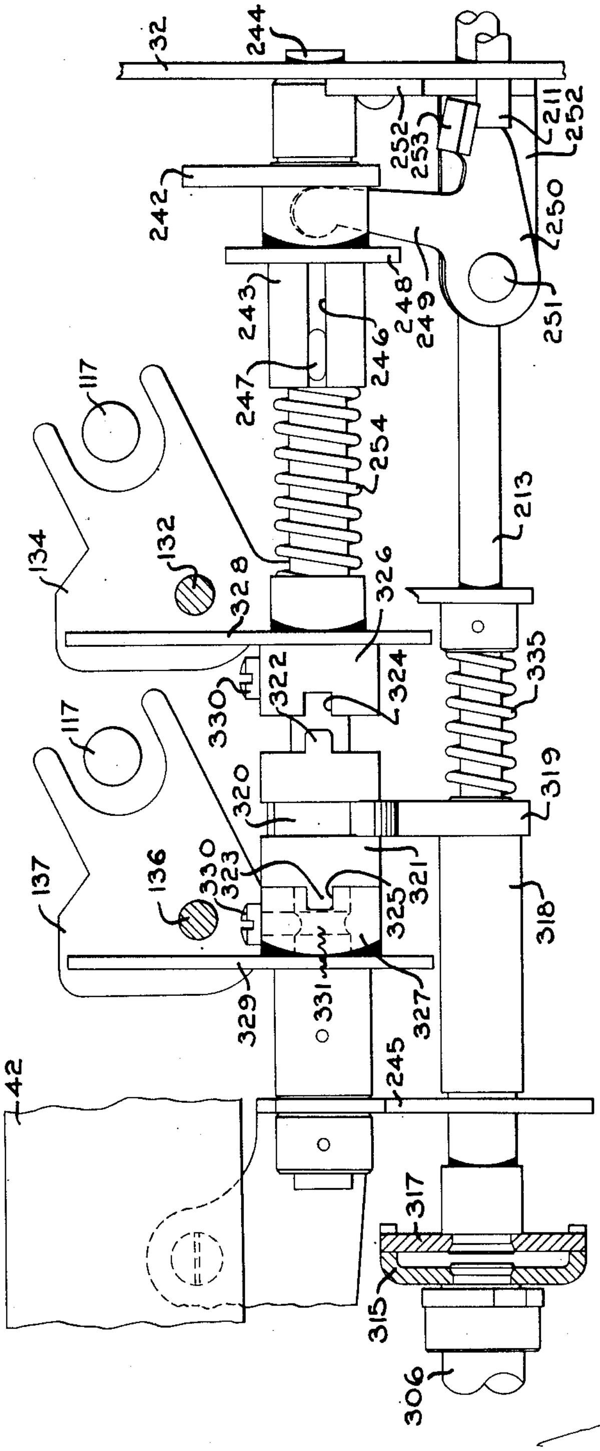
Fig. 7 is a front elevation of the carriage shift reversing mechanism.

In order to cause the carriage to be shifted one ordinal position to the left, that is, in the direction of increasing orders, during the machine cycle following movement of shaft 177 to position C, a cam 240 (Fig. 6) provided with an actuating nose 241 is secured to the shaft 177 just within the right side frame 32 of the machine. When the shaft 177 is moved toward the right by the action of the pin 233 on the flag 226, the cam 240 is moved toward a follower arm 242 (see also Fig. 7) which is secured to a sleeve 243 mounted on a transverse shaft 244. This shaft is journalled at its right-hand end in the side frame 32 and at its left-hand end in a bracket 245 secured to the frame cross-bar 42. The sleeve 243 is slotted as shown at 246 so as to receive a key 247 secured to the shaft 244 whereby the sleeve may be moved axially along the shaft 244 but any rocking movements of the sleeve will be transmitted to the shaft. The sleeve is provided with a flange 248 which, together with the follower arm 242, provides an annular groove within which is received a finger 249 provided on a bellcrank lever 250. This lever is pivotally mounted on a stud 251 mounted in a bracket 252 which is riveted to the right side frame 32. The bellcrank lever is provided with a bent-over extension 253 which lies over the left-hand end of the stud 211 carried by the lever 170 (see Fig. 2). Hence, when the division key is depressed and the lever 170 rocked clockwise, as viewed in Fig. 2, the pin 211 will be elevated so as to rotate the bellcrank 250 counter-clockwise, as viewed in Fig. 7, thereby moving the sleeve 243 and follower arm 242 to the left against the opposition of a compression spring 254 situated on the shaft 244. Referring again to Fig. 6, this movement of the follower arm 242 by the pin 211 is such as to bring the follower arm into the plane of the nose 241 on the cam 240 when the shaft 177 occupies its active or right-hand position. The radial positioning of the nose 241 on the cam 240 is such that when the shaft 177 is moved from position B to position C, the cam will rock the follower arm 242 clockwise, as viewed from the left-hand side of the machine, thereby causing the shaft 244 to which the sleeve 243 is keyed to be similarly rocked. This will cause the left shift clutch to be engaged, through mechanism later to be described, and thereby cause the carriage to be moved one ordinal space to the left.

The calculating machine is normally provided with a counter reversing key 258 (Fig. 3) which lies beside the division key 145 and is normally depressed along with the division key when a division operation is initiated.

Depression of the key 258 causes the revolutions counter to be operated in a reverse or negative direction thereby causing the subtraction cycles occurring during a division operation to be counted in a positive sense. The mechanism for accomplishing this result is indicated generally at 259 in Fig. 3 and for a complete disclosure of this part of the machine attention is invited to U. S. Patent No. 2,294,111 granted to Carl M. F. Friden on August 25, 1942.

A division operation may be terminated at any stage of the proceedings by means of a manually operable stop lever (not shown) which serves to release the latch 186 from the pin 185 thereby allowing the connecting lever 170 to return to its normal, inactive position as shown in Fig. 2. The slide 104 will thus be released and the motor will stop. The division stop lever and its associated mechanism is fully shown and described in Patent No. 2,327,981, supra.

*Automatic division aligner*

At the conclusion of a division operation the numeral wheel carriage of the calculating machine is normally located in its extreme left-hand position and it is then necessary for the machine operator to shift the carriage to the right until the highest order digits of the dividend and the divisor are brought into proper alignment for a division operation. In order to render this operation automatic and to relieve the operator of the necessity of controlling the shift of the carriage until the dividend and divisor are properly aligned for the performance of a division operation, the mechanism hereinafter to be described has been provided. In the use of the machine embodying this mechanism, the dividend is entered in the accumulator inboard with respect to the transfer detecting stud member 216. This mechanism makes use of the previously described division program control mechanism, the normal operation of this mechanism being suitably modified so as to cause the carriage to be automatically tabulated to the right until the factors are properly aligned, after which an automatic division operation will automatically take place. For this purpose a link 300 (Fig. 3) is pivotally connected at its forward end to the actuator 162 and at its rear end to an arm 301 secured to a cross-shaft 302 journalled between the side frames of the machine. Hence, when the division key 145 is depressed and the actuator 162 released for counter-clockwise rotation under the influence of the heavy spring 164, the shaft 302 will be rocked counter-clockwise. As seen in Figs. 4 and 6, the shaft 302 has secured thereto a forwardly directed arm 303 which is provided at its forward end with a stud 304 which lies above the forward end of an arm 305 secured to a sleeve 306 journalled on the shaft 213. Thus, when the shaft 302 is rocked counter-clockwise, the stud 304 will contact the arm 305 and cause this arm and the sleeve 306 to also be rocked counter-clockwise. The sleeve 306 is clutched at 307 (Fig. 6) to the sleeve 229 which has secured thereto an arm 308 (Figs. 1 and 4) provided at its rear end with a bent-over ear 309. This ear is adapted to cooperate with a latch 310 loosely pivoted on the gate shaft 65, the latch being urged into engagement with the ear by a spring 311 tensioned between the latch and the arm 308. Upon counter-clockwise movement of the sleeve 229, the ear 309 will be engaged by the latch 310 so as to maintain the sleeves 229 and 306 in their rocked positions.

Also secured to the sleeve 306 is a disc cam 315 (Figs. 5, 6 and 7) which is provided with a series of four inclined cam faces 316 which cooperate with a four-pointed cam follower 317 which is secured to a sleeve 318 journalled on the shaft 213. On the right-hand end of the sleeve 318 is secured a shift fork 319 which engages with an annular groove 320 provided in a selector clutch element 321 which is slidably keyed to the shaft 244. The member 321 is provided on its righthand end with clutch teeth 322 and on its left-hand end with clutch teeth 323 (Fig. 7) which are adapted to engage with corresponding notches 324 and 325, respectively, provided in collars 326 and 327 of a right shift clutch engaging arm 328 and a left shift clutch engaging arm 329. The collars 326 and 327 are rotatably mounted on the shaft 244 but are held against axial displacement therealong by means of set screws 330 which are threaded into the collars and engage with grooves 331 provided in the shaft 244. As shown in Fig. 6, the cam follower 317 is normally seated in the bottom of the notches provided in the cam 315 as a result of the action of a compression spring 335 located on the shaft 213, this spring bearing at one end against the shifter fork 319 and at the other end against a collar fastened to the shaft 213. When the parts are positioned as shown in Fig. 6, the clutch member 221 is in its left-hand position wherein the teeth 323 (Fig. 7) thereon engage with the notches 325 provided in the collar 327 on the left shift engaging arm 329. Hence, when the shaft 244 is rocked by the program control mechanism, the arm 329 will be operated (see also Fig. 5) so as to move the shifting fork 137 for the left shift clutch rearwardly and thereby cause the carriage to be shifted one ordinal space to the left. However, when the sleeve 306 is rocked counter-clockwise, as previously described, the inclined cam faces 316 on the cam 315 will force the sleeve 318 to the right against the opposition of the spring 335 thereby disengaging the teeth 323 on the member 321 from notches 325 and engaging the teeth 322 with the notches 324 in the collar 326 of the right shift engaging arm 328. Hence, when the shaft 244 is rocked by the cam 249 during operation of the program control mechanism, the right shift clutch will be engaged so as to cause movement of the carriage to the right.

In order to cause operation of the program control mechanism to take place immediately upon the initiation of a division operation, an arm 340 (Fig. 6) secured to the sleeve 229 is provided with a pin 341 which overlies the rearward extension 228 (Fig. 4) of the flag 226. Hence, upon the rocking of the sleeve 229 upon the initiation of a division operation the flag 226 will be rocked clockwise against the action of the spring 227 so as to move the flag 232 into the path of the pin 233 and thereby cause the program control shaft 177 to be moved to the right into its operative position. The program control mechanism will function as in the case of a division operation with the exception that the carriage will be shifted one ordinal space to the right for each rotation of the shaft 177 instead of to the left as in a conventional division operation. Hence, the carriage will be moved to the right, that is, in the direction of decreasing orders, to cause the highest digits of the dividend and divisor to be brought into alignment. By virtue of the latch 310 (Fig. 4) which maintains the sleeves 229 and 306 in their rocked positions, the program control mechanism will be maintained effective and the right shift clutch will be conditioned for operation so long as the latch remains in engagement with the ear 309.

In order to terminate the shifting of the carriage to the right once a dividend and divisor have been properly aligned for a division operation, the latch 310 is provided with an upwardly extending tail 345 which lies in front of the pin 218 connected with the transfer detent pin 221. Upon the occurrence of a tens-transfer involving the transfer gear 75 to which the detent pin 218 is connected, the pin 218 will move forwardly so as to engage the tail 345 and disengage the latch 310 from the ear 309 whereupon the spring 311 will rock the sleeves 229 and 306 clockwise as viewed in Figs. 1 and 4. The tens-transfer will normally occur as the result of an overdraft in the accumulator dials 61 whereupon the higher order dials will move from "0" to "9" and hence cause a transfer to be effected which will cause the latch 310 to be disabled. The overdraft in the accumulator will occur during the subtraction cycle of the subtract, add-back and shift program enforced by the program control mechanism once on each revolution of the shaft 177. Thus, when the carriage has been moved sufficiently far to the right to locate the highest digit in the divisor to the left of the highest digit in the dividend, or when the highest digits of the factors are brought into alignment and the divisor is larger than the dividend, an overdraft will result during the subtraction cycle which will trip the latch 310 and permit the sleeves 229 and 306 to be returned in a clockwise direction under the influence of the spring 311. Upon the restoration of the sleeves 229 and 306 to their normal positions, the pin 341 will release the flag 226 and the clutch 321 will be moved to the left by spring 335 so as to condition the left shift clutch for operation by the program control mechanism. The machine will now be controlled by the conventional automatic division mechanism operating in its normal manner to cause a left-hand shift of the carriage each time an overdraft occurs. As previously stated, an overdraft causes the transfer detent pin 221 to be moved forward and the flag 232 to be rocked by the forward end of the link 217 thereby causing the shaft 177 to be moved to the right in order to initiate a cycle of operation of the program control mechanism.

As set forth in Patent No. 2,327,981, the latch 186 (Fig. 3) is disabled by a pawl on the carriage when the carriage reaches its extreme left-hand position thereby terminating the division operation. Hence, in the machine shown and described in the patent, a subsequent division operation cannot be initiated with the carriage in its lowest order position since the latch is held out of engagement with the stud 181. In the present machine, however, means is provided for disabling the pawl on the carriage when the division key is depressed so as to enable the connecting lever 170 to be retained in its operative position by the latch 186 regardless of the position of the carriage.

As shown in Figs. 2 and 6, a pawl 350 mounted on the carriage serves to disable the latch 186 when the carriage reaches its extreme left-hand position. This pawl is provided with an arm 351 bearing a pin 352 which is adapted to be engaged by a shoulder formed on the rear end of a pawl 353 pivoted on a screw 354 fastened to an extension 355 provided on the rear end of an interlock slide 356. This slide carries a stud 357 which lies just behind the cycle initiating slide 104 so that when the latter slide is moved toward the rear of the machine when the division key is depressed, the slide 356 will be carried rearwardly along with it. Hence, the shoulder on the pawl 353 will engage the pin 352 and rock the pawl 350 counterclockwise (Fig. 6) against the tension of a spring 358 so as to release the latch 186.

The pawl 353 is made yieldable so that it may give way when contacted by the pin 352 as the carriage moves into its leftmost position with the slide 356 in its rearward position. This is accomplished by means of a spring 359 which normally holds a formed-over ear 360 on the pawl in engagement with the edge of the extension 355, the spring 359 being made somewhat weaker than the spring 358. Hence, the spring 359 will be overcome by the spring 358 and allow the pawl 350 to terminate the division operation when the carriage returns to its lowest order position at the end of a division problem.

A rule of operation of the machine disclosed herein is that the dividend should be entered in the accumulator register inboard of the tens transfer detecting or sensing member—in the form shown, the pin 218—at the higher order end of the keyboard and transfer mechanism, with no significant dividend figure being in a higher ordinal position than the detecting or sensing member. When the machine is operated in accordance with this rule, there will be no premature stopping of the aligning operation caused by a zero intervening between outboard significant dividend figures standing to the left of the detecting member 218.

*Operation*

The novel factor aligning mechanism hereinbefore described operates as follows:

When any given number is to be divided by any other given number on the present machine, the operator first enters the dividend into the accumulator wheels 61 with the dividend figures inboard of the detecting member 218, no significant dividend figure being in a higher ordinal position than the member 218. The dividend may be entered by setting this figure on the amount keys 20 and depressing the plus bar 90 so as to give the machine a single cycle of operation and thereby cause the amount to be entered into the accumulator wheels in a positive sense, or the dividend may be entered into the wheels 61 by means of the twirler knobs normally provided on the upper ends of the numeral wheel shafts 59 for this purpose. The dividend having been entered into the wheels 61 and the revolutions counter wheels 80 having been zeroized, the operator then sets the divisor on the amount keys 20 and depresses the division key 145 so as to trip the division setting actuator 162 (Fig. 3) and cause the sleeves 229 and 306 to be rocked counter-clockwise where they will be held by the latch 310. This causes the clutch member 321 (Fig. 6) to be moved to the right so as to condition the right shift clutch for engagement and also causes the flag 232 to be rocked into operative position. At the same time, the overdraft control link 217 (Fig. 4) will be raised into position behind the bail 225 so as to enable conventional control of the program control mechanism during the actual dividing operation which follows immediately after the factors have been properly aligned. When the division key 145 is depressed, the electric driving motor will be energized and the main clutch engaged in the well-known manner so as to initiate cycling of the main operating mechanism of the machine. Since the flag is maintained in operative position by the pin 341, the program control mechanism will be effective to cause subtract, add, and right shift cycles to automatically take place, the carriage being moved one ordinal space to the right for each complete revolution of the mutilated gear 198 (Fig. 3). The machine will continue operating in this manner until the carriage has been shifted sufficiently far to the right to cause the highest digit in the dividend to be positioned one ordinal space to the right of the highest digit in the divisor whereupon an overdraft will occur in the accumulator dials 61 thereby causing the latch 310 to be tripped and the division aligner mechanism to be restored to its original, or inoperative, position. When this occurs, the flag will be released by the pin 341 and the clutch member 321 will be moved to the left so as to condition the left shift clutch for engagement whereupon a conventional automatic division operation will ensue. During division, the divisor will be subtracted from the dividend a sufficient number of times to cause an overdraft to occur in the higher order wheels of the accumulator whereupon the link 217 (Fig. 4) will be moved forward so as to rock the flag into operative position to cause cycling of the program control mechanism. This will result in adding back the divisor so as to correct the overdraft; then a left shifting movement of the carriage so as to translate the dividend one ordinal space to the left with respect to the divisor set up on the keys 20; and finally the setting of the gate for subtraction. The divisor will then be subtracted from the dividend until an overdraft again occurs in the accumulator dials which will cause the flag to again be set into operative position and again causing cycling of the program control mechanism to be initiated. This operation will be continued until the carriage has reached its extreme left-hand position whereupon the lever 170 (Fig. 2) will be released from the latch 186 (Fig. 3) so as to terminate the division operation and stop cycling of the machine. The machine is now ready for another division operation in which the dividend is entered into the accumulator wheels and the divisor is set-up on the keyboard after which the division key is depressed so as to again set the division aligner mechanism into operation as previously described and cause right-hand shifting of the carriage until the factors are aligned, after which the conventional automatic division mechanism will take over control of the machine and cause the dividend to be divided by the divisor in a fully automatic manner.

I claim:

1. In a calculating machine of the class described having a keyboard in which the digits of a divisor may be set, a shiftable carriage, a register in said carriage in which the digits of a dividend may be set, means for shifting said carriage in one direction or another with respect to said keyboard, said means being normally conditioned to shift the carriage in the direction of increasing orders of said register, and means for actuating said register either positively or negatively in accordance with the value set up in said keyboard, the combination of means for dividing an amount set in said dividend register by an amount set in said keyboard by the method of successive subtraction, said means including a manually controlled mechanism for initiating a division operation, means at the higher order end of said keyboard and actuating means for detecting the occurrence of a tens-transfer in the higher orders of said register, and a cyclically operable programming device for automatically controlling the sequential operation of said actuating means and said carriage shifting means; means for setting a dividend in said register inboard of said detecting means with no significant figure of said dividend being in a higher ordinal position than said detecting means; a settable device operable by said tens-transfer detecting means for causing an operation of said programming device to be initiated thereby causing positive actuation of said register, shifting of the carriage and negative actuation of the register, auxiliary control mechanism operable by said manually controlled mechanism for causing said settable device to be operated and said carriage shifting means to be conditioned to shift the register in the direction of decreasing orders of said register; and means controlled by said tens-transfer detecting means for disabling said auxiliary control mechanism when a transfer occurs in one of the higher orders of said register thereby placing said settable device under the control of said tens-transfer detecting means and causing said carriage shifting means to be conditioned to shift the register in the direction of increasing orders of said register.

2. In a machine of the class described having a keyboard on which the digits of a divisor may be set, a shiftable carriage, a register in said carriage on which the digits of a dividend may be registered, means for actuating said register in accordance with the amount set on said keyboard, means for shifting said carriage in one direction or another with respect to said keyboard, said means including a right shift clutch and a left shift clutch and means for engaging one or the other of said clutches, said means being normally conditioned to engage said left shift clutch, means at the higher order end of said keyboard for detecting a tens-transfer in one of the higher orders of the register, and means for setting a dividend in said register inboard of said detecting means with no significant dividend figure being in a higher ordinal position than said detecting means, the combination of means for dividing said dividend by a divisor set in said keyboard including a manually controlled mechanism for initiating a division operation, and a cyclically operable programming device normally operated by said tens-transfer detecting device for controlling the operation of said actuating means and said clutch engaging means; a normally inoperative factor aligning device for causing continuous and repeated operation of said programming device and for conditioning said engaging means to engage said right shift clutch; means operated by said manually controlled mechanism for rendering said factor aligning device operative; and means controlled by said tens-transfer detecting means for rendering said device inoperative when a transfer occurs in one of the higher orders of the register thereby disabling the continuous and repeated operation of said programming device and causing said engaging means to be conditioned to engage said left shift clutch.

3. In a calculating machine of the class described having a value entering means for receiving the divisor factor of a division problem, a register for receiving the dividend factor, means for transmitting the divisor factor from said value entering means into said register, and means for shifting said register relative to said value entering means, the combination of means for automatically dividing the dividend by the divisor including a member movable from an idle position to an active position, means for initiating operation of said dividing means and for moving said member from its idle position to its active position; means for retaining said member in its active position throughout a division operation; means for causing said retaining means to be disabled at the end of a division operation; and means operated by said initiating means for disabling said last-named means so as to render said retaining means again effective to hold said member in its active position.

4. In a calculating machine of the class described having a value entering means for receiving the divisor factor of a division problem, a shiftable carriage, a register mounted in said carriage for receiving the dividend factor, means for transmitting the divisor factor from said value entering means into said register, and means for shifting said carriage, the combination of means for automatically dividing the dividend by the divisor including a member movable from an idle position to an active position, means, including a manipulative member, for initiating operation of said dividing means and for moving said member from its idle position to its active position; means for retaining said member in its active position throughout a division operation; means movable in accordance with the movement of said carriage for causing said retaining means to be disabled in a predetermined position of said carriage; and means operable upon movement of said manipulative member for disabling said last named means so as to render said retaining means once more effective to hold said member in its active position.

5. In a calculating machine of the class described having a value entering means for receiving the divisor factor of a division problem, a shiftable carriage, a register mounted in said carriage for receiving the dividend factor, means for transmitting the divisor factor from said value entering means into said register, and means for shifting said carriage, the combination of means for automatically dividing the dividend by the divisor including a member movable from an idle position to an active position, means, including a manipulative member, for initiating operation of said dividing means and for moving said member from its idle position to its active position; a latch for retaining said member in its active position; a device mounted on said carriage for causing said latch to be disabled in a predetermined position of said carriage; and means moving in response to movement of said manipulative member for disabling said device so as to render said latch once again effective to hold said member in its active position.

6. In a calculating machine of the class described having a value entering means for receiving the divisor factor of a division problem, a shiftable carriage, a register mounted in said carriage for receiving the dividend factor, means for transmitting the divisor factor from said value entering means into said register, and means for shifting said carriage, the combination of means for automatically dividing the dividend by the divisor including a member movable from an idle position to an active position, means, including a manipulative member, for initiating operation of said dividing means and for moving said member from its idle position to its active position; a latch for retaining said member in its active position; a latch-disabling pawl mounted on said carriage, said pawl being movable into engagement with said latch so as to disable the same in a predetermined position of said carriage; and means controlled by said manipulative member for moving said pawl out of engagement with said latch when said member is manipulated thereby enabling said latch to once again hold said member in its active position.

7. In a calculating machine of the class described having means for giving the machine cycles of operation, a frame, a plural order amount entering means on said frame for receiving the divisor factor, a plural order register for receiving the dividend factor, means for shifting said register ordinally relative to said amount entering means, a tens-transfer mechanism for said register, a detecting member mounted on said frame at the higher order end of said amount entering means for detecting a transfer in an order of said register ordinally aligned with said detecting member, and means for entering the value in said amount entering means in said register inboard of said detecting member additively or subtractively, the combination of a division control mechanism controlled by operation of said detecting member for operating the value entering means and the shifting means to cause the divisor factor to be subtracted from the dividend factor and the register to be shifted intermittently to the left during continuous, uninterrupted cycling of the machine; means for modifying the control of said division control mechanism so as to cause said shifting means to shift said register to the right in sequential cycles of operation; and means controlled by said detecting member for disabling said modifying means when a transfer occurs in an order of said register aligned with said detecting member so as to enable said shifting means to again shift said register to the left and to restore control of said division control mechanism to said detecting member.

8. A calculating machine capable of carrying out problems in division comprising a value indexing means in which the various digits of a divisor may be set; a carriage mounted for endwise shifting movement on said machine; a register comprised of a plurality of ordinally arranged numeral wheels rotatably mounted on said carriage, some of said wheels lying inboard with respect to said value indexing means and others lying outboard thereof, said wheels being settable to represent the various digits of a dividend; a tens-carry mechanism for transferring a unit from a lower order register wheel to a higher order register wheel; a detecting member at the higher order end of said value indexing means for detecting a tens-carry in a numeral wheel of said register aligned with said detecting means; means for entering the dividend in said register inboard of said detecting member with no significant figure of said dividend being in a higher ordinal position than said detecting member; means for successively subtracting the divisor from the dividend, adding the divisor to the dividend, and shifting said carriage one step to the right in sequence so as to bring the higher order inboard wheels of said register into active position with respect to a divisor value set in said value indexing means; and means controlled by said detecting member for terminating the operation of said shifting means to the right when the dividend and divisor are correctly aligned for the performance of a division operation.

9. In a calculating machine of the class described having a plural order value indexing means, a plural order register shiftable relative thereto, means adjacent the higher order end of said value indexing means for detecting a tens-transfer in an order of said register which is ordinally aligned with said detecting means, a plural order differential actuating means for entering a value set in said indexing means into said register inboard of said detecting means, and means for shifting said register, the combination of a division mechanism for controlling the operation of the machine in division operations, including means controlled by said detecting means for operating said differential actuating means and for intermittently operating said shifting means for shifting said register in such a direction as to bring the lower orders thereof into alignment with said value entering means, manual means for initiating operation of said division mechanism, aligning means associated with a said manual means and operated therewith for temporarily modifying normal operation of said division mechanism by said detecting means to cause said actuators to be operated and said register to be shifted cyclically in such a direction as to bring the higher orders thereof into alignment with said value entering means; and means controlled by said tens-transfer detecting means for disabling said aligning means when a transfer occurs in the order of said register aligned with said detecting means to thereby enable said division mechanism to control the operation of the machine in the normal manner.

10. In a calculating machine of the class described having a plural order keyboard, a plural order register shiftable relative thereto, register shifting means, differential actuator means for entering the keyboard factor into the aligned orders of said register additively or subtractively, an overdraft sensing means adjacent the higher order end of said differential actuator means, a normally inoperative division mechanism for controlling the operation of the machine to divide a dividend registered in the register by a divisor set in the keyboard, said mechanism including means operated by said sensing means for controlling operation of said actuator means to cause the divisor to be subtracted from the dividend repeatedly to an overdraft and for thereafter operating said register shifting means to shift said register in such a direction as to bring the lower orders thereof into alignment with said keyboard, and a manipulable member for rendering said division mechanism operative; the combination of aligning means controlled by said manipulable member for modifying normal operation of said division mechanism by said sensing means to cause operation of said differential actuator means to subtract the divisor from the dividend once and for modifying normal operation of the register shifting means to shift the register in the opposite direction in repetitive sequence in order to bring the higher orders thereof into alignment with said value entering means; and means controlled by said overdraft sensing means for disabling said aligning means and to enable said division mechanism to control the normal operation of the machine under control of said sensing means.

11. In a calculating machine adapted to perform division by the successive subtraction method comprising a plural order keyboard; a plural order register shiftable relative thereto; differential actuating means operable to transmit a value set in said keyboard into said register; and overdraft detecting means adjacent the higher order end of said differential actuating means; a reversible shifting means for shifting said register including a left shift clutch, a right shift clutch, an initiating member operable to cause engagement of either shift clutch, and means for selectively conditioning said initiating member to operate either of said clutches; means for resiliently biasing said initiating member to a position in which it is conditioned to operate said left shift clutch; a division mechanism for controlling the operation of said differential actuating means and said shifting means in division operations including means controlled by said overdraft detecting means for operating the differential actuating means subtractively to an overdraft and thereafter operating said initiating member; a manipulable member for controlling the operation of said division mechanism; means controlled by said manipulable member for moving said initiating member to the position in which it is conditioned to operate said right shift clutch and for cyclically operating said overdraft controlled means; and means controlled by said overdraft detecting means for releasing said member to said biasing means and for terminating cyclic operation of said overdraft controlled means when a transfer occurs in one of the higher orders of the register.

12. A calculating machine for performing division operations comprising a frame, a shiftable carriage on said frame, a plurality of ordinally arranged register wheels mounted on said carriage in which may be registered the dividend factor, a plural order selection means for receiving the divisor factor, a plural order differential actuating means, a tens-transfer mechanism for transferring a unit from a lower order register wheel to a higher order register wheel, a detecting member movably mounted on said frame adjacent the higher order end of said selection means for detecting a transfer in a register wheel ordinally aligned with said detecting member, means for shifting said carriage ordinally including a movable device settable in one position for causing said carriage to be shifted to the right and settable in another position for causing said carriage to be shifted to the left, an intermittently operable division program mechanism controlled by said detecting member, a division initiating key, auxiliary means cooperating with said key for moving said device to said one position and for initiating a cyclic operation of the division program mechanism to cause operation of the machine in the steps of a single subtraction, a single addition, and operation of the carriage shifting means; and means controlled by movement of said detecting member when it detects a transfer in a register wheel aligned with said detecting member for disabling said auxiliary means and moving said device to said other position.

GEORGE W. HOPKINS.

References Cited in the file of this patent

UNITED STATES PATENTS

| Number | Name | Date |
|---|---|---|
| 2,327,981 | Friden | Aug. 31, 1943 |
| 2,365,507 | Allen | Dec. 19, 1944 |
| 2,408,097 | Pott | Sept. 24, 1946 |
| 2,416,809 | Avery | Mar. 4, 1947 |